(12) United States Patent
Jastorff (10) Patent No.: US 11,974,666 B1
(45) Date of Patent: May 7, 2024

(54) DIFFERENTIAL GEAR STORAGE ASSEMBLY

(71) Applicant: Zachary Jastorff, Sac City, IA (US)

(72) Inventor: Zachary Jastorff, Sac City, IA (US)

( * ) Notice: Subject to any disclaimer, the term of this patent is extended or adjusted under 35 U.S.C. 154(b) by 0 days.

(21) Appl. No.: 18/130,413

(22) Filed: Apr. 3, 2023

(51) Int. Cl.
*A47B 81/00* (2006.01)

(52) U.S. Cl.
CPC .................... *A47B 81/00* (2013.01)

(58) Field of Classification Search
CPC ........ A47B 81/00; A47B 73/00; A47B 73/004
See application file for complete search history.

(56) References Cited

U.S. PATENT DOCUMENTS

| 85,208 | A | * | 12/1868 | Burrow | A47B 73/00 |
| | | | | | 211/74 |
| 877,064 | A | * | 1/1908 | Edsell | G11B 33/02 |
| | | | | | 211/74 |
| 2,338,310 | A | * | 1/1944 | Barnes | A47B 73/00 |
| | | | | | 211/74 |
| 2,580,676 | A | * | 1/1952 | Gross | A47B 73/00 |
| | | | | | 211/75 |
| 2,748,459 | A | | 6/1956 | Orr | |
| 2,903,258 | A | | 9/1956 | Jovanovich | |
| 2,803,872 | A | | 8/1957 | Massa | |
| 2,840,345 | A | * | 6/1958 | Atkinson | B66F 5/04 |
| | | | | | 254/133 R |
| D250,625 | S | * | 12/1978 | Leventhal | D6/682.2 |
| D252,065 | S | * | 6/1979 | Leventhal | D7/706 |
| 4,482,065 | A | * | 11/1984 | Altemose | A47B 73/00 |
| | | | | | 211/74 |
| 4,496,124 | A | * | 1/1985 | Cole | A47B 73/004 |
| | | | | | D7/619.1 |
| 4,795,038 | A | * | 1/1989 | Johnson | A47F 7/283 |
| | | | | | 211/74 |
| 5,180,066 | A | * | 1/1993 | McArdle | A47G 23/0241 |
| | | | | | 211/74 |
| 5,183,165 | A | * | 2/1993 | Acona | A47B 73/00 |
| | | | | | 211/74 |
| 6,322,061 | B1 | | 11/2001 | Maser | |
| 6,619,640 | B1 | | 9/2003 | Ploski | |
| D488,644 | S | * | 4/2004 | Park | D6/682.2 |

(Continued)

FOREIGN PATENT DOCUMENTS

| CA | 2432248 | 12/2004 |
| DE | 2545971 A1 * | 4/1977 |

(Continued)

*Primary Examiner* — Stanton L Krycinski (57) ABSTRACT

A differential gear storage assembly includes a panel having a plurality of storage wells. Each well insertably receives a center gear of a differential drive for storage. A drain in the panel receives oil that drips from each center gear. A plurality of bolts is strategically positioned with respect to the plurality of storage wells. A pan is slidably insertable into a drainage well in the panel to contain the oil from the drain. A plurality of supports is pivotally coupled to the panel and each of the supports is positionable in a deployed position to support the panel in an upright position on a horizontal support surface. A plurality of wing nuts is each threadable onto a respective one of the bolts and each of the wing nuts extends beyond a respective one of the storage wells for retaining the respective center gear in the respective storage well.

10 Claims, 6 Drawing Sheets

(56) References Cited

U.S. PATENT DOCUMENTS

| | | | |
|---|---|---|---|
| 7,048,130 B2 * | 5/2006 | Hurst | A47B 73/00 211/74 |
| D544,041 S | 6/2007 | Murphy | |
| D548,026 S * | 8/2007 | Whiteman | D7/701 |
| 7,269,970 B2 * | 9/2007 | Robertson | F25D 3/06 62/457.5 |
| 7,506,771 B2 * | 3/2009 | Bianchini | A47B 73/00 211/75 |
| D590,183 S * | 4/2009 | Hensel | D6/672 |
| 8,061,538 B2 * | 11/2011 | Seldon | F16B 12/26 211/74 |
| 8,267,259 B2 * | 9/2012 | Fisher | A47B 73/004 211/89.01 |
| 8,403,156 B1 * | 3/2013 | Boone | A47F 7/283 211/75 |
| 8,640,889 B2 * | 2/2014 | Gasper | A47F 5/0823 211/74 |
| 9,545,151 B2 * | 1/2017 | Kaelin | B08B 9/42 |
| 9,775,458 B2 * | 10/2017 | Rivera | A47G 29/14 |
| D931,684 S * | 9/2021 | Zeng | D7/600.4 |
| 11,559,139 B2 * | 1/2023 | Ervin | A47F 7/283 |
| 2004/0089621 A1 * | 5/2004 | Gangloff | A47F 7/283 211/74 |
| 2007/0108143 A1 * | 5/2007 | Kilduff | A47B 73/00 211/74 |
| 2011/0204010 A1 * | 8/2011 | Hastu | A47B 73/006 211/74 |
| 2013/0277322 A1 * | 10/2013 | Tiberio | A61B 50/20 211/74 |
| 2015/0108719 A1 | 4/2015 | Devine | |
| 2017/0014962 A1 | 1/2017 | Melchiori | |

FOREIGN PATENT DOCUMENTS

| | | | |
|---|---|---|---|
| DE | 29806539 U1 * | 7/1998 | A47B 73/00 |
| DE | 19962466 C1 * | 2/2002 | A47B 73/00 |
| EP | 0066005 A1 * | 12/1982 | |
| FR | 318755 A * | 10/1902 | |
| FR | 2763822 A1 * | 12/1998 | A47B 73/00 |
| GB | 2253344 A * | 9/1992 | A47B 73/004 |
| GB | 2397516 A * | 7/2004 | A47B 73/00 |

\* cited by examiner

DIFFERENTIAL GEAR STORAGE ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to gear storage devices and more particularly pertains to a new gear storage device for storing a plurality of center gears from a differential drive. The device includes a plurality of storage wells that each insertably receives a center gear for storage. The device includes a drainage well integrated into the panel, a drain that extends between the storage wells and the drainage well and a pan that is insertable into the drainage well to capture oil from the center gear. The device includes a pair of supports that are each pivotally attached to the panel and which can be positioned in a deployed position for retaining the panel in an upright orientation on a horizontal support surface.

(2) Description of Related Art Including Information Disclosed Under 37 CFR 1.97 and 1.98

The prior art relates to gear storage devices including a variety of mechanical devices that each includes some manner of cradle to engage an automotive transmission or an automotive differential drive and a lifting element for lifting, lowering or supporting the automotive transmission or the automotive differential drive. The prior art further discloses a support stand that includes a yoke that is pivotally mounted to a stand to facilitate a work piece to be mounted to the yoke for positioning the work piece to be worked upon. In no instance does the prior art disclose a gear storage device that includes a panel with storage wells to insertably receive a gear and a drain integrated into the panel to drain oil that drips from the gear.

BRIEF SUMMARY OF THE INVENTION

An embodiment of the disclosure meets the needs presented above by generally comprising a panel having a plurality of storage wells. Each well insertably receives a center gear of a differential drive for storage. A drain in the panel receives oil that drips from each center gear. A plurality of bolts is strategically positioned with respect to the plurality of storage wells. A pan is slidably insertable into a drainage well in the panel to contain the oil from the drain. A plurality of supports is pivotally coupled to the panel and each of the supports is positionable in a deployed position to support the panel in an upright position on a horizontal support surface. A plurality of wing nuts is each threadable onto a respective one of the bolts and each of the wing nuts extends beyond a respective one of the storage wells for retaining the respective center gear in the respective storage well.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 6 thereof, a new gear storage device embodying the principles and concepts of an embodiment of the disclosure and generally designated by the reference numeral 10 will be described.

As best illustrated in FIGS. 1 through 6, the differential gear storage assembly 10 generally comprises a panel 12 that has a plurality of storage wells 14 each is integrated into the panel 12. Each of the storage wells 14 has a rounded shape to insertably receive a center gear 16 of a differential drive for storage. The differential drive may be from a nine inch Ford rear end, manufactured by Ford Motor Company, 1 American Road, Dearborn, MI 48126, or other type of differential drive employed in motorized vehicles. Additionally, the panel 12 has a drain 18 that is integrated into the panel 12 and the drain 18 is in fluid communication with each of the storage wells 14 to receive oil 20 that drips from the center gear 16 in each of the storage wells 14. The panel 12 may be comprised of a fluid impermeable material, including but not being limited to plastic or metal, such that the panel 12 will not absorb the oil 20.

The panel 12 has a front surface 22, a back surface 24 and a perimeter surface 26 extending between the front surface 22 and the back surface 24; the perimeter surface 26 has a top side 28, a bottom side 30, a first lateral side 32 and a second lateral side 34. The panel 12 is elongated between the top side 28 and the bottom side 30 and each of the storage wells 14 extends into the front surface 22 toward the back surface 24. The storage wells 14 are evenly spaced apart from each other and are distributed between the top side 28 and the bottom side 30 of the perimeter surface 26. Each of the storage wells 14 has a lateral bounding surface 36 and a rear bounding surface 38 lying on a plane that is oriented parallel to the front surface 22 of the panel 12. The front surface 22 of the panel 12 has a drainage well 40 extending toward the back surface 24 of the panel 12. The drainage well 40 has a bounding surface 42 that has a plurality of intersecting sides 44 such that the drainage well 40 has a rectangular shape. Furthermore, the drainage well is positioned between the plurality of storage wells 14 and the bottom side 30 of the perimeter surface 26 of the panel 12.

The drain 18 comprises a conduit 46 that is positioned between the front surface 22 of the panel 12 and the back surface 24 of the panel 12. The conduit 46 has a trunk portion 48 that is in fluid communication with the drainage well 40. Additionally, the conduit 46 includes a plurality of branch portions 50 each branching away from the trunk portion 48 and intersecting a respective one of the storage wells 14 to route the oil 20 into the drainage well 40. Each of the branch portions 50 extends through an intersection between the rear bounding surface 38 and the lateral bounding surface 36 of the respective storage well 14.

A plurality of bolts 52 is provided and each of the bolts 52 is coupled to and extends away from the panel 12. Each of the plurality of bolts 52 is strategically positioned with respect to the plurality of storage wells 14. Each of the bolts 52 extends away from the front surface 22 of the panel 12 and the plurality of bolts 52 is evenly spaced apart from each other and is distributed between the top side 28 and the bottom side 30 of the perimeter surface 26 of the panel 12. Each of the plurality of bolts 52 is positioned adjacent to a respective one of the storage wells 14.

The plurality of bolts 52 is arranged into a set of first bolts 54 and a set of second bolts 56. Each of the set of first bolts 54 is positioned between the plurality of storage wells 14 and the first lateral side 32 of the perimeter surface 26 of the panel 12. Additionally, each of the set of second bolts 56 is positioned between the plurality of storage wells 14 and the second lateral side 34 of the perimeter surface 26. Each of the bolts 52 has an outside surface 58 that is threaded and each of the bolts 52 may have a length of approximately 2.5 cm.

A pan 60 is slidably insertable into the drainage well 40 and the pan 60 is aligned with the drain 18 when the pan 60 is positioned in the drainage well 40 to contain the oil from the drain 18. The pan 60 is removable from the drainage well 40 to facilitate the oil 20 contained in the pan 60 to be disposed of. The pan 60 has a front wall 62 that is aligned with the front surface 22 of the panel 12 when the pan 60 is seated into the drainage well 40 and the pan 60 is positioned beneath the trunk portion 48 of the conduit 46 when the pan 60 is inserted into the drainage well 40. Additionally, the pan 60 has a handle 64 that is coupled to the front wall 62 of the pan 60 thereby facilitating the handle 64 to be gripped for removing the pan 60 from the drainage well 40. As is most clearly shown in FIG. 3, the pan 60 has a rear wall 65 that angles away from the front wall 62.

A plurality of supports 66 is provided and each of the supports 66 is pivotally coupled to the panel 12. Each of the supports 66 is positionable in a deployed position having the supports 66 angling away from the panel 12. In this way the pair of supports 66 can support the panel 12 in an upright position on a horizontal support surface 68. Each of the supports 66 comprises a channel bracket 70 which has a first end 72 and a second end 74. The first end 72 is pivotally coupled to the back surface 24 of the panel 12 at a point located adjacent to the bottom side 30 of the perimeter surface 26 of the panel 12. The channel bracket 70 associated with each of the supports 66 is positioned adjacent to a respective one of the first lateral side 32 and the second lateral side 34 of the perimeter surface 26 of the panel 12. The channel bracket 70 is oriented perpendicular to the back surface 24 of the panel 12 when the supports 66 are in the deployed position and the channel bracket 70 rests against the back surface 24 of the panel 12 when the supports 66 are in the stored position.

Each of the supports 66 includes an arm 76 that has a primary end 78 which is pivotally coupled to the back surface 24 of the panel 12. The arm 76 has a secondary end 80 that is slidably attached to the channel bracket 70 such that the secondary end 80 can travel between the first end 72 and the second end 74 of the channel bracket 70. The secondary end 80 slides toward the second end 74 of the channel bracket 70 when the channel bracket 70 is in the deployed position such that the arm 76 angles between the back surface 24 and the channel bracket 70. Conversely, the secondary end 80 slides toward the first end 72 of the channel bracket 70 when the channel bracket 70 is in the stored position such that the arm 76 lies against the back surface 24.

A plurality of wing nuts 82 is provided and each of the wing nuts 82 is threadable onto a respective one of the bolts 52. Each of the wing nuts 82 extends beyond a respective one of the storage wells 14 when the wing nuts 82 are threaded onto the respective bolt 52. In this way each of the plurality of wing nuts 82 extends over a respective center gear 16 for retaining the respective center gear 16 in the respective storage well 14. A pair of hangers 84 is each attached to the back surface 24 of the panel 12 and each of the hangers 84 extends upwardly beyond the top side 28 of the perimeter surface 26 of the panel 12. Each of the hangers 84 has a fastener hole 86 to accommodate a fastener 88 for hanging the panel 12 on a vertical support surface 90.

Figure 1:
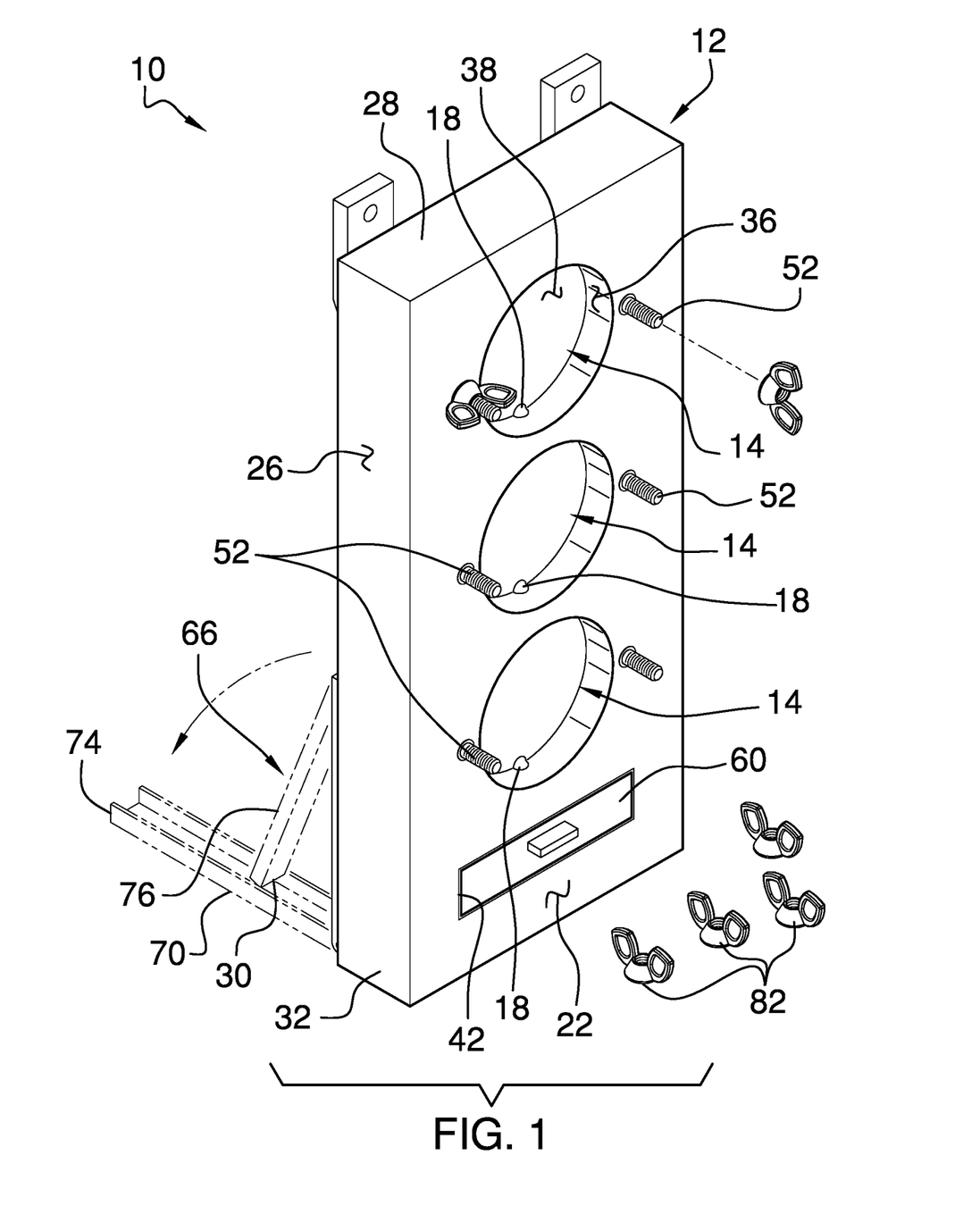
FIG. 1 is a front perspective view of a differential gear storage assembly according to an embodiment of the disclosure.
Figure 2:
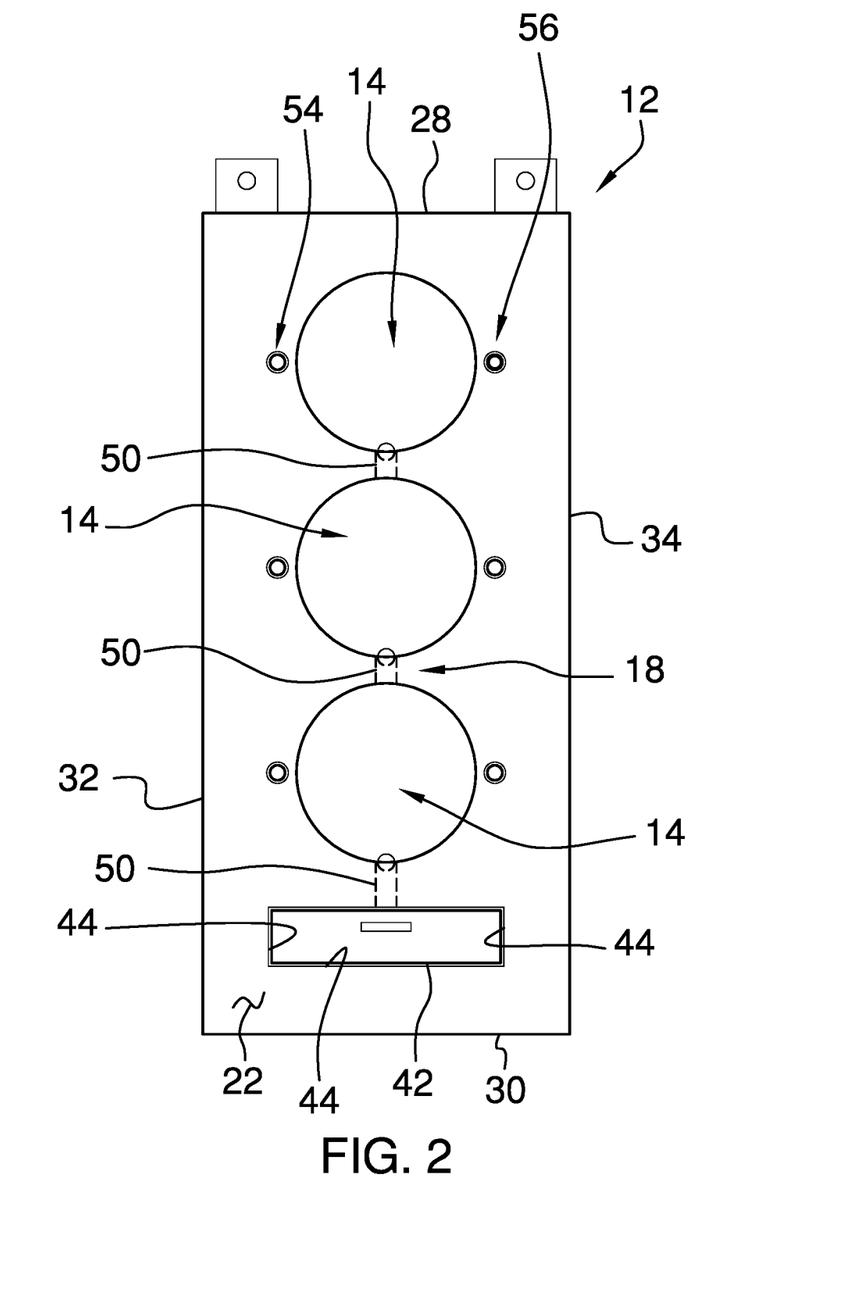
FIG. 2 is a front phantom view of an embodiment of the disclosure.
Figure 3:
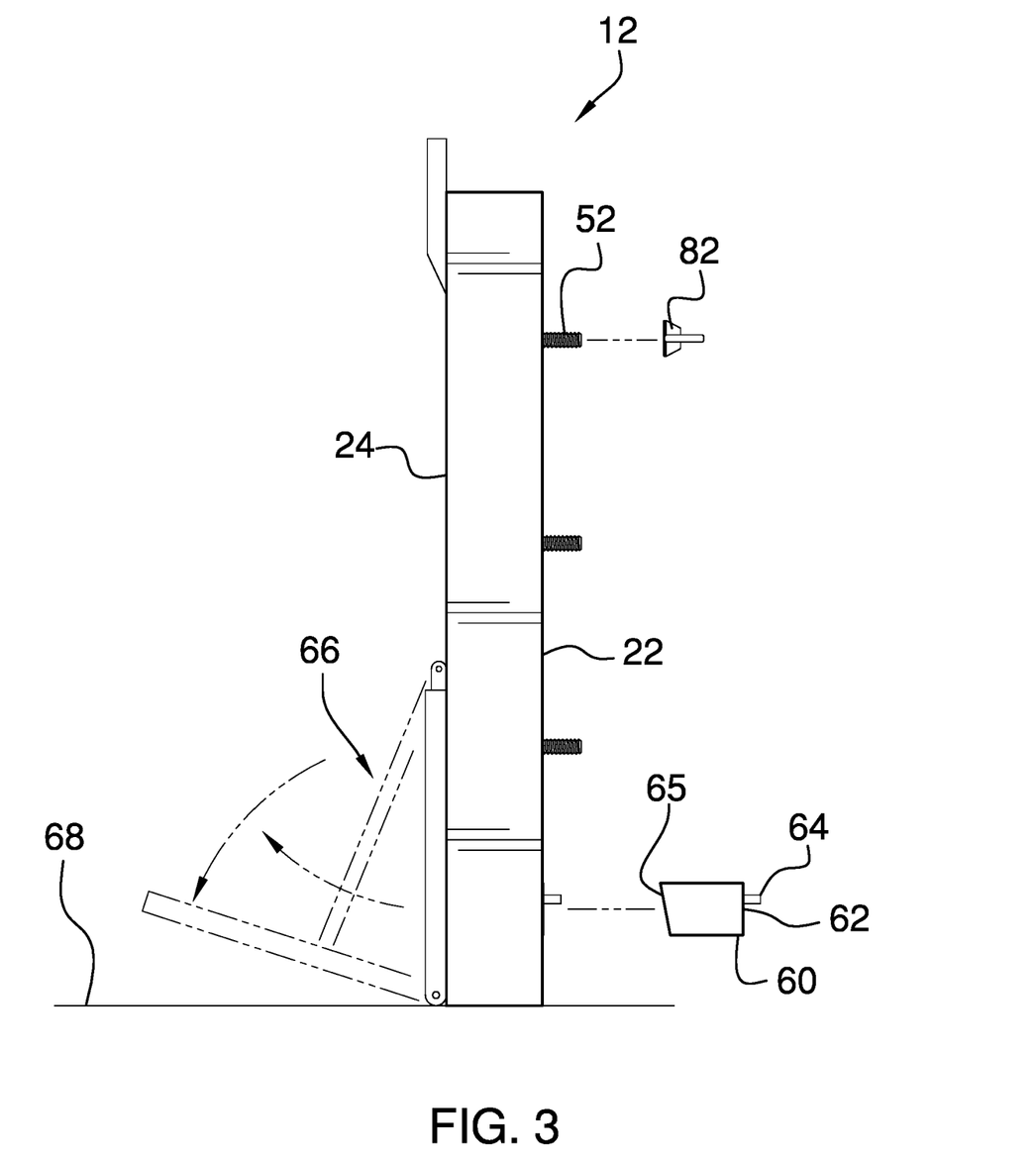
FIG. 3 is a right side view of an embodiment of the disclosure.
Figure 4:
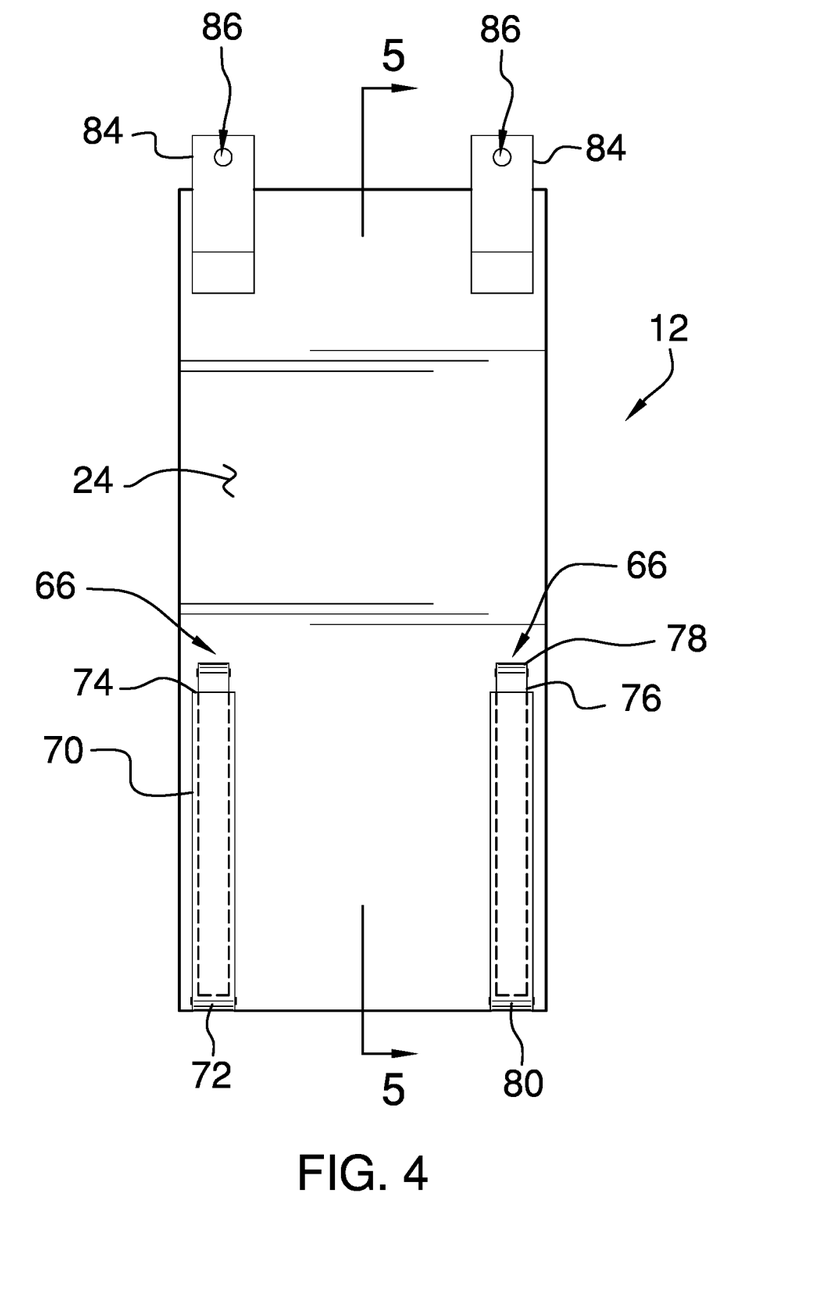
FIG. 4 is a back phantom view of an embodiment of the disclosure.
Figure 5:
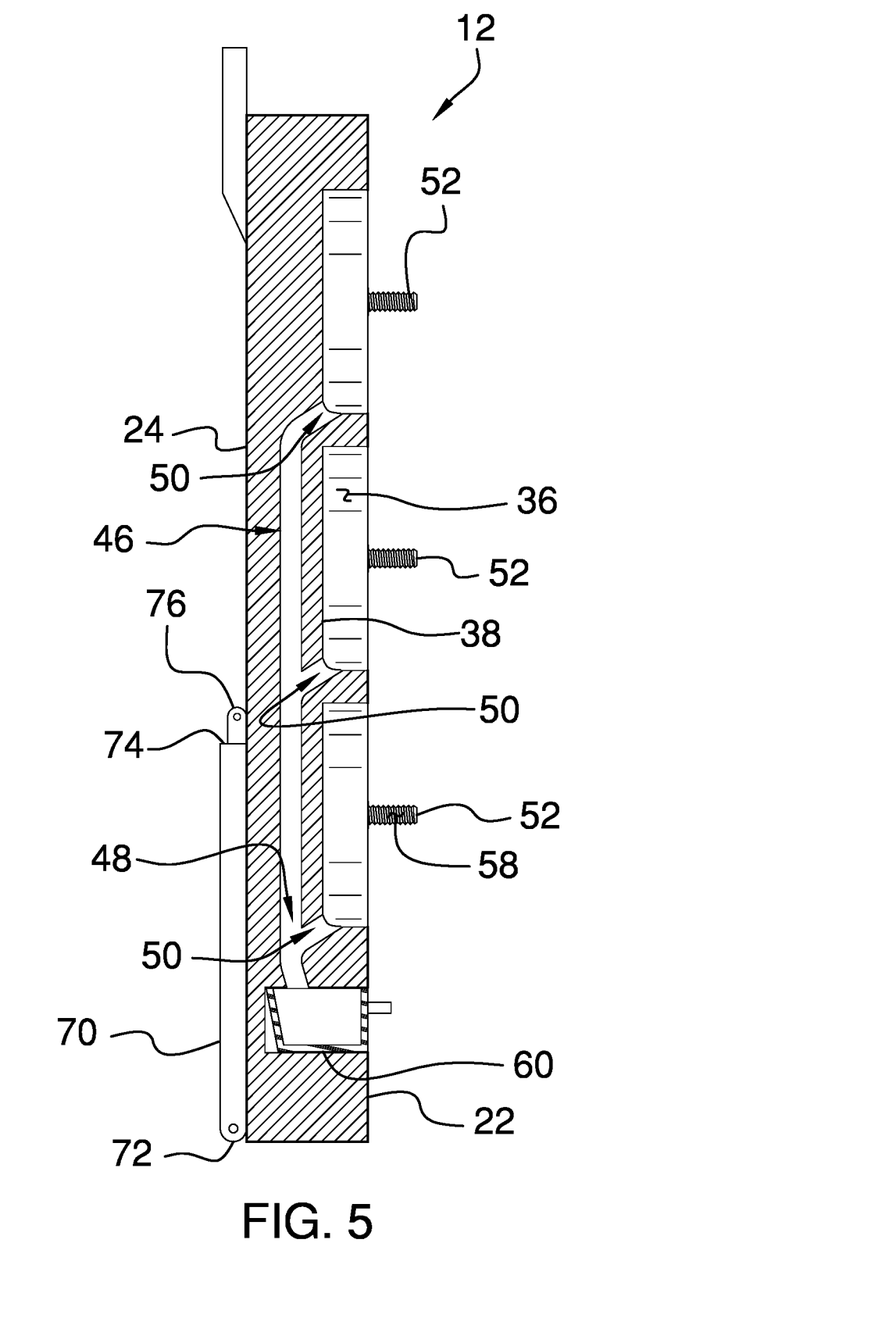
FIG. 5 is a cross sectional view taken along line 5-5 of FIG. 4 of an embodiment of the disclosure.
Figure 6:
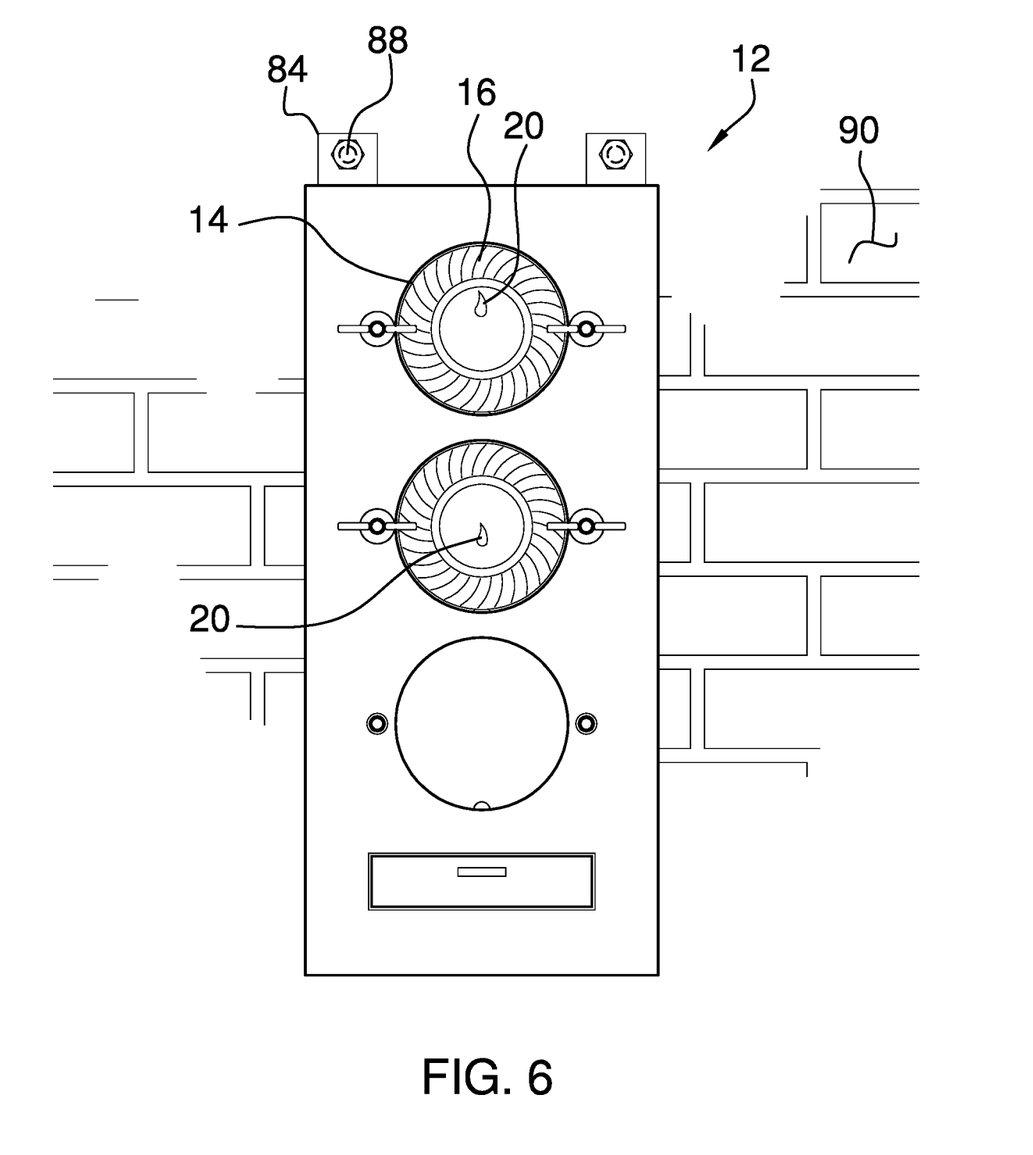
FIG. 6 is a front in-use view of an embodiment of the disclosure.

In use, each of the hangers 84 is mounted to the vertical support surface 90 or each of the supports 66 is positioned in the deployed position to stand the panel 12 on the horizontal support surface 68. A center gear 16 is placed into a respective one of the storage wells 14 for storing the center gear 16 and a pair of wing nuts 82 is each threaded onto the pair of bolts 52 that are located adjacent to the respective storage well 14. In this way the wing nuts 82 inhibit the center gear 16 from falling out of the respective storage well 14. Additionally, oil 20 that drips from the center gear 16 runs down the conduit 46 and is collected in the pan 60. In this way the center gear 16 can be stored without developing a pool of oil 20, which commonly occurs when storing the center gear 16 on a table, for example. The pan 60 can be removed from the drainage well 40 to facilitate the oil 20 in the pan 60 to be emptied at any time.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

The invention claimed is:

1. A differential gear storage assembly for storing a center gear of a differential drive, said assembly comprising:
   a panel having a plurality of storage wells each being integrated into said panel, each of said storage wells having a rounded shape wherein each of said storage wells is configured to insertably receive a center gear of a differential drive for storage, said panel having a drain being integrated into said panel, said drain being in fluid communication with each of said storage wells wherein said drain is configured to receive oil that drips from said center gear in each of said storage wells;
   a plurality of bolts, each of said bolts being coupled to and extending away from said panel, each of said plurality of bolts being positioned with respect to said plurality of storage wells;
   a pan being slidably insertable into a drainage well of a front surface of said panel, said pan being aligned with said drain when said pan is positioned in said drainage well wherein said pan is configured to contain the oil from said drain, said pan being removable from said drainage well wherein said pan is configured to facilitate the oil to be disposed of;
   a plurality of supports, each of said supports being pivotally coupled to said panel, each of said supports being positionable in a deployed position having said supports angling away from said panel wherein said plurality of supports is configured to support said panel in an upright position on a horizontal support surface; and
   a plurality of wing nuts, each of said wing nuts being threadable onto a respective one of said bolts, each of said wing nuts extending beyond a respective one of said storage wells when said wing nuts are threaded onto said respective bolt wherein each of said plurality of wing nuts is configured to extend over a respective center gear for retaining the respective center gear in said respective storage well.

2. The assembly according to claim 1, wherein said panel has said front surface, a back surface and a perimeter surface extending between said front surface and said back surface, said perimeter surface having a top side, a bottom side, a first lateral side and a second lateral side, said panel being elongated between said top side and said bottom side, each of said storage wells extending into said front surface toward said back surface, said storage wells being evenly spaced apart from each other and being distributed between said top side and said bottom side of said perimeter surface, each of said storage wells having a lateral bounding surface and a rear bounding surface lying on a plane being oriented parallel to said front surface of said panel.

3. The assembly according to claim 2, wherein said drainage well extends toward said back surface of said panel, said drainage well having a bounding surface having a plurality of intersecting sides such that said drainage well has a rectangular shape, said drainage well being positioned between said plurality of storage wells and said bottom side of said perimeter surface of said panel.

4. The assembly according to claim 3, wherein:
   said drain comprises a conduit being positioned between said front surface of said panel and said back surface of said panel;
   said conduit having a trunk portion being in fluid communication with said drainage well;
   said conduit includes a plurality of branch portions each branching away from said trunk portion and intersecting a respective one of said storage wells wherein said conduit is configured to route the oil into said drainage well; and
   each of said branch portions extends through an intersection between said rear bounding surface and said lateral bounding surface of said respective storage well.

5. The assembly according to claim 2, wherein each of said bolts extends away from said front surface of said panel, said plurality of bolts being evenly spaced apart from each other and being distributed between said top side and said bottom side of said perimeter surface of said panel, each of said plurality of bolts being positioned adjacent to a respective one of said storage wells.

6. The assembly according to claim 5, wherein:
   said plurality of bolts is arranged into a set of first bolts and a set of second bolts;
   each of said set of first bolts is positioned between said plurality of storage wells and said first lateral side of said perimeter surface of said panel; and
   each of said set of second bolts is positioned between said plurality of storage wells and said second lateral side of said perimeter surface.

7. The assembly according to claim 4, wherein:
   said pan has a front wall being aligned with said front surface of said panel when said pan is seated into said drainage well, said pan being positioned beneath said trunk portion of said conduit when said pan is inserted into said drainage well; and
   said pan has a handle being coupled to said front wall of said pan thereby facilitating said handle to be gripped for removing said pan from said drainage well.

8. The assembly according to claim 2, wherein each of said supports comprises a channel bracket having a first end and a second end, said first end being pivotally coupled to said back surface of said panel at a point located adjacent to said bottom side of said perimeter surface of said panel, said channel bracket associated with each of said supports being positioned adjacent, to a respective one of said first lateral side and said second lateral side of said perimeter surface of said panel, said channel bracket being oriented perpendicular to said back surface of said panel when said supports are in said deployed position, said channel bracket resting against said back surface of said panel when said supports are in said a stored position.

9. The assembly according to claim 8, wherein each of said pair of supports includes an arm having a primary end being pivotally coupled to said back surface of said panel, said arm having a secondary end being slidably attached to said channel bracket such that said secondary end can travel between said first end and said second end of said channel bracket, said secondary end sliding toward said second end of said channel bracket when said channel bracket is in said deployed position such that said arm angles between said back surface and said channel bracket, said secondary end sliding toward said first end of said channel bracket when said channel bracket is in a storage position such that said arm lies against said back surface.

10. A differential gear storage assembly for storing a center gear of a differential drive, said assembly comprising:
   a panel having a plurality of storage wells each being integrated into said panel, each of said storage wells having a rounded shape wherein each of said storage wells is configured to insertably receive a center gear of a differential drive for storage, said panel having a drain being integrated into said panel, said drain being in fluid communication with each of said storage wells wherein said drain is configured to receive oil that drips from said center gear in each of said storage wells, said panel having a front surface, a back surface and a perimeter surface extending between said front surface and said back surface, said perimeter surface having a top side, a bottom side, a first lateral side and a second lateral side, said panel being elongated between said top side and said bottom side, each of said storage wells extending into said front surface toward said back surface, said storage wells being evenly spaced apart from each other and being distributed between said top side and said bottom side of said perimeter surface, each of said storage wells having a lateral bounding surface and a rear bounding surface lying on a plane being oriented parallel to said front surface of said panel, said front surface of said panel having a drainage well extending toward said back surface of said panel, said drainage well having a bounding surface having a plurality of intersecting sides such that said drainage well has a rectangular shape, said drainage well being positioned between said plurality of storage wells and said bottom side of said perimeter surface of said panel, said drain comprising a conduit being positioned between said front surface of said panel and said back surface of said panel, said conduit having a trunk portion being in fluid communication with said drainage well, said conduit including a plurality of branch portions each branching away from said trunk portion and intersecting a respective one of said storage wells wherein said conduit is configured to route the oil into said drainage well, each of said branch portions extending through an intersection between said rear bounding surface and said lateral bounding surface of said respective storage well;
   a plurality of bolts, each of said bolts being coupled to and extending away from said panel, each of said plurality of bolts being positioned with respect to said plurality of storage wells, each of said bolts extending away from said front surface of said panel, said plurality of bolts being evenly spaced apart from each other and being distributed between said top side and said bottom side of said perimeter surface of said panel, each of said plurality of bolts being positioned adjacent to a respective one of said storage wells, said plurality of bolts being arranged into a set of first bolts and a set of second bolts, each of said set of first bolts being positioned between said plurality of storage wells and said first lateral side of said perimeter surface of said panel, each of said set of second bolts being positioned between said plurality of storage wells and said second lateral side of said perimeter surface;
   a pan being slidably insertable into said drainage well, said pan being aligned with said drain when said pan is positioned in said drainage well wherein said pan is configured to contain the oil from said drain, said pan being removable from said drainage well wherein said pan is configured to facilitate the oil to be disposed of, said pan having a front wall being aligned with said front surface of said panel when said pan is seated into said drainage well, said pan being positioned beneath said trunk portion of said conduit when said pan is inserted into said drainage well, said pan having a handle being coupled to said front wall of said pan thereby facilitating said handle to be gripped for removing said pan from said drainage well;
   a plurality of supports, each of said supports being pivotally coupled to said panel, each of said supports being positionable in a deployed position having said supports angling away from said panel wherein said plurality of supports is configured to support said panel in an upright position on a horizontal support surface, each of said supports comprising:
      a channel bracket having a first end and a second end, said first end being pivotally coupled to said back surface of said panel at a point located adjacent to said bottom side of said perimeter surface of said panel, said channel bracket associated with each of said supports being positioned adjacent to a respective one of said first lateral side and said second lateral side of said perimeter surface of said panel, said channel bracket being oriented perpendicular to said back surface of said panel when said supports are in said deployed position, said channel bracket resting against said back surface of said panel when said supports are in a stored position; and
      an arm having a primary end being pivotally coupled to said back surface of said panel, said arm having a secondary end being slidably attached to said channel bracket such that said secondary end can travel between said first end and said second end of said channel bracket, said secondary end sliding toward said second end of said channel bracket when said channel bracket is in said deployed position such that said arm angles between said back surface and said channel bracket, said secondary end sliding toward said first end of said channel bracket when said channel bracket is in a storage position such that said arm lies against said back surface; and
   a plurality of wing nuts, each of said wing nuts being threadable onto a respective one of said bolts, each of said wing nuts extending beyond a respective one of said storage wells when said wing nuts are threaded onto said respective bolt wherein each of said plurality of wing nuts is configured to extend over a respective center gear for retaining the respective center gear in said respective storage well.

* * * * *